United States Patent [19]
Burckhardt et al.

[11] 3,817,491
[45] June 18, 1974

[54] RAPIDLY SHIFTING, LEAK-PROOF ELECTROMAGNETICALLY ACTUATED DISCHARGE VALVE

[75] Inventors: Manfred H. Burckhardt, Waiblingen; Paul Schwerdt, Esslingen-Hegensberg, both of Germany

[73] Assignee: Daimler-Benz Aktiengesellschaft, Stuttgart-Untertuerkheim, Germany

[22] Filed: May 12, 1972

[21] Appl. No.: 252,586

[30] Foreign Application Priority Data
May 14, 1971 Germany............................ 2124025

[52] U.S. Cl............................... 251/141, 251/129
[51] Int. Cl............................................ F16k 31/06
[58] Field of Search............................ 251/139, 141

[56] References Cited
UNITED STATES PATENTS
2,546,325   3/1951   Wasserlein.......................... 251/139
3,183,932   5/1965   Karpus, Jr........................ 251/139 X

*Primary Examiner*—Arnold Rosenthal
*Attorney, Agent, or Firm*—Craig & Antonelli

[57]  ABSTRACT

A rapidly shifting leak-proof, electromagnetically actuated valve for liquids or gases, especially for brake slippage control systems in motor vehicles, with a direct hydraulic control of the medium to be controlled as well as a piston armature forming or carrying the valve body closure member; the medium thereby flows into the valve substantially centrally, circumcirculates the valve body which is arranged substantially centrally and flows off through a central valve seat, whereby the closing time of the valve is improved by a surface provided on the piston armature which is adapted to be acted upon by the flow energy of the inflowing medium.

20 Claims, 1 Drawing Figure

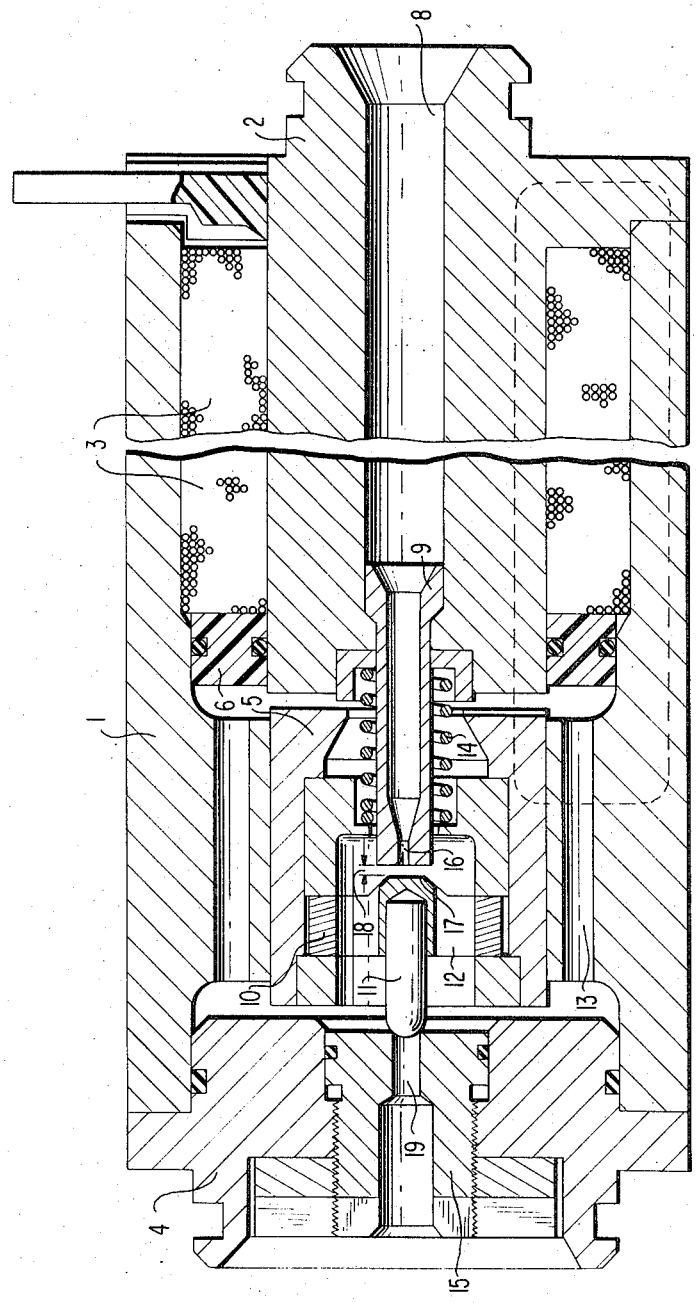

RAPIDLY SHIFTING, LEAK-PROOF ELECTROMAGNETICALLY ACTUATED DISCHARGE VALVE

The present invention relates to a rapidly shifting, leakproof electromagnetically actuated discharge valve for liquids or gases, especially for brake slippage control installations in motor vehicles, with direct hydraulic control of the medium to be controlled as well as with a possibly adjustable piston armature forming or supporting the valve closure body, whereby the medium to be controlled flows-in centrally, circumcirculates the centrally arranged valve closure body and is able to flow off through the central valve seat.

Such types of electromagnetically actuated valves are utilized in the control and regulating art for the control of the passage of liquids or gases at pressures up to 250 atmospheres excess pressure. The requirements which are made of such valves are: quick shifting periods, slight dimensions, leak-proofness, simple and inexpensive construction. Hydraulic pre-controlled valves are known in the art which enable relatively short shifting times, however, they cannot fulfill all the mentioned requirements to the desired degree.

Inlet and outlet or discharge valves which satisfy the aforementioned requirements, have already been proposed heretofore. The aim of the present invention is to further reduce the shifting periods, especially the closure time of the proposed discharge valves.

The underlying problems are solved according to the present invention in that a surface provided at the piston armature in the form of a baffle area is adapted to be acted upon by the flow energy of the in-flowing medium.

A jet pipe or tube is inserted into the central inlet channel of the medium to be controlled, by means of which the medium with an opened valve is conducted with a high velocity onto an areal part of the piston armature. For the closing of the valve, in addition to the return spring, also the flow energy of the medium is used whereby the closing time of the valve is reduced. By the insertion of jet tubes with different bores, it is possible to achieve differing high flow velocities of the medium and therewith different closing times of the valve. For that reason, the present invention prefers a solution to insert different jet pipes (nozzles) into the pole body. Another possibility—if only one clearly defined closing time is desired—resides in constructing the pole body accordingly.

Accordingly, it is an object of the present invention to provide a rapidly shifting, leak-proof, electromagnetically actuated discharge valve which avoids by simple means the aforementioned shortcomings and drawbacks encountered in the prior art.

Another object of the present invention resides in a rapidly shifting electromagnetically actuated discharge valve, particularly for brake slippage control systems of motor vehicles, which not only assures complete fluid-tightness of the device but additionally considerably reduces the shifting time required, especially for the closing of a discharge valve.

A further object of the present invention resides in an electromagnetically actuated discharge valve of the aforementioned type which is relatively compact and low in cost coupled with rapid shifting action.

Still another object of the present invention resides in a rapidly shifting leak-proof electromagnetically actuated discharge valve of the type described above which permits an easy change-over in the shifting times of the valve by mere replacement of a single part.

These and further objects, features and advantages of the present invention will become more apparent from the following description when taken in connection with the accompanying drawing which shows, for purposes of illustration only, one embodiment in accordance with the present invention, and wherein:

The single FIGURE is an axial cross-sectional view through a discharge valve in accordance with the present invention which is illustrated in the de-energized condition.

Referring now to the single FIGURE of the drawing, the illustrated discharge valve essentially consists of the valve housing 1, of the pole body 2 inserted into the valve housing 1 and having a winding or coil 3 mounted on the pole body 2, of the cover 4 and of the piston armature 5 sliding to and fro between the pole body 2 and the cover 4. The valve is leak-proof by the use of a ring 6 consisting of glass-fiber-reinforced polyamide with inserted sealing rings 7. For a completely satisfactory and rapid functioning of the valve, the piston armature 5 is provided with a slide layer, preferably Teflon. A jet pipe 9 is inserted into the central inlet channel 8 within the pole body 2, which projects far into the correspondingly shaped piston armature 5. The needle support 10 which is seated within the piston armature 5, is constructed surface-shaped (areal) on the side facing the jet pipe 9 and carries the valve needle or valve pin 11 as well as is provided with bores 12 for the passage or through-flow of the medium. The piston armature 5 is surrounded by the medium to be controlled.

Since the piston armature 5 has to displace the medium to be controlled during its to and fro movements, several bores 13 are provided in the valve housing 1 in order to facilitate this operation.

In the normal rest position, i.e., with the coil 3 de-energized, the compression spring 14 forces the piston armature 5 away from the pole body 2 and therewith presses the needle or pin 11 against the hollow screw 15 serving as seating ring. As a result thereof, the passage is blocked for the medium and the valve is closed. With an opened valve, the piston armature 5 is attracted by the field produced by the now energized coil 3 and thus the valve seat is opened up so that the medium is discharged with a high velocity through the bore 16 of the jet pipe 9 and impinges on the surface 17 of the needle or pin support 10. The pressure of the medium and the bore 16 of the jet pipe 9 have to be so matched with the distance 18 thereof (in the attracted condition) from the surface 17 of the needle support 10 to one another that this surface or area 17 acts as baffle plate. The medium subsequently circumcirculates the needle or pin support 10 and can leave the valve through the opening 19 of the hollow screw 15.

If now the valve is closed, when turning off the energizing current for the coil 3, then in addition to the spring force, also the flow energy of the medium upon impact on the surface 17 can be utilized in order to close the valve still more rapidly than would already be the case without this baffle plate.

While we have shown and described only one embodiment in accordance with the present invention, it is understood that the same is not limited thereto, but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A rapidly-shifting leak-proof electromagnetically actuated valve for fluids, with a direct hydraulic control of the medium to be controlled as well as with a piston armature means provided with a valve closure means, in which the medium to be controlled circumcirculates the valve closure means and is able to flow off through a valve seat means, characterized in that means are provided for increasing the velocity of the in-flowing medium and in that the piston armature means is provided with a surface means adapted to be actuated by the flow energy of the increased velocity in-flowing medium to thereby shorten the time for the actuation of the armature means in the direction of normal flow of the medium, the means for increasing the velocity of the in-flowing medium being a jet tube having a bore which decreases in cross section between the inlet end and the outlet end, the outlet end having a smaller cross section than the inlet end and being disposed opposite said surface means.

2. A valve according to claim 1, characterized in that the piston armature means forms the closure means.

3. A valve according to claim 1, characterized in that the piston armature means carries the valve closure means.

4. A valve according to claim 1, characterized in that the in-flow of the medium to be controlled is substantially central.

5. A valve according to claim 4, characterized in that the valve closure means is substantially centrally arranged.

6. A valve according to claim 5, characterized in that the valve seat means is substantially centrally arranged.

7. A valve according to claim 6, characterized in that a pole body means is provided with an inlet bore into which the jet tube is inserted.

8. A valve according to claim 7, characterized in that the bore of the jet tube is so matched to the distance between the outlet end of the jet tube and the surface means at the piston armature means that said surface means acts as baffle plate.

9. A valve according to claim 8, characterized in that a part of the valve closure means is constructed as baffle plate.

10. A valve according to claim 9, characterized in that said part is a ring forming a valve needle support.

11. A valve according to claim 10, characterized in that said ring is provided with axial bores for the passage therethrough of the medium to be controlled.

12. A valve according to claim 1, characterized in that a pole body means is provided with an inlet bore into which the jet tube is inserted.

13. A valve according to claim 12, characterized in that the bore of the jet tube is so matched to the distance between the outlet end of the jet tube means and the surface means at the piston armature means that said surface means acts as baffle plate.

14. A valve according to claim 1, characterized in that a part of the valve closure means is constructed as baffle plate.

15. A valve according to claim 14, characterized in that said part is a ring forming a valve needle support.

16. A valve according to claim 15, characterized in that said ring is provided with axial bores for the passage therethrough of the medium to be controlled.

17. A valve according to claim 1, characterized in that the jet tube directs the in-flowing medium directly onto the surface means of the piston armature means.

18. A valve according to claim 12, characterized in that the jet tube extends outwardly beyond an end face of the pole body means and inwardly of an end face of the piston armature means.

19. A valve according to claim 1, characterized in that the surface means at the piston armature means serves as a baffle plate means for directing the medium flow.

20. A valve according to claim 1, characterized in that the valve is arranged for connection in a brake slippage control system of a motor vehicle.

* * * * *